Patented Jan. 24, 1928.

1,657,323

UNITED STATES PATENT OFFICE.

LEO SIMON, OF NEW YORK, N. Y., ASSIGNOR TO SIDNEY STERN, OF BROOKLYN, NEW YORK.

PAINT AND VARNISH REMOVER.

No Drawing.   Application filed November 23, 1922.   Serial No. 602,889.

My invention relates to compositions used as paint and varnish removers, of the kind adapted to so act upon the paint or varnish to be removed that the latter may be readily taken off by aid of scraper, a brush, a cloth or the like.

More particularly stated, I seek to produce a paint and varnish remover of this general type, having a number of advantages, and acting to some extent as an emulsion capable of softening, mingling with, and assimilating the paint or varnish, so as to destroy its character as a paint or varnish.

I have made the discovery that if a solution of balata, or any kind of chicle, in any suitable solvent, be mixed with a solution of waxes or fats of any origin, whether mineral, vegetable or animal, and to this mixture there is then added a paint or varnish softener or solvent, the resulting mass is an emulsion. In preparing this emulsion the ingredients are stirred or agitated, and no addition of heat is necessary, as the material can be prepared at ordinary room temperatures.

In the manufacture of many of the paint and varnish removers in common use, it has heretofore been the practice to dissolve waxy or fatty materials in any solvent suitable for the purpose, particularly benzol; and to add to the solution thus formed a paint solvent or a mixture of paint solvents not having the function of a solvent for fats or waxes. The result is, that in most cases the wax is partially precipitated and separated in the form of a grainy, crystalline mass, floating in a liquid. The paint and varnish remover is thus rendered less active, and at best is capable of only partially removing the paint or varnish. Moreover a paint and varnish remover of this kind does not readily adhere to a paint brush or to a straight vertical surface or a ceiling from which the paint is to be removed, and upon this account can not readily be used without wasting the material.

If a solution of balata or of chicle or of any member of the balata and chicle group is mixed with a solution of waxy or fatty material, and this solution then be mixed with a paint and varnish softener or solvent, the resulting mixture has a tendency to precipitate the balata or the chicle, along with the wax or fat, in a finely divided form. The final result is a fine salve-like emulsion in a colloidal condition, and which does not flow very freely from a brush, and which is capable of adhering to upright surfaces and ceilings, and which acts quickly, and without loss either by undue evaporation or by dropping away from the brush.

I have also discovered that excellent results along this line may be obtained by using wool grease as a substitute for the fats or waxes.

Wool grease, being soft, readily adheres to any ordinary surface; and it appears to have a tendency to confer this property, to some extent at least, upon other waxes and fats when used therewith as herein described.

It will be noted that an emulsion, free of water, is formed by the use of the ingredients named.

Solvents for balata and chicle, and other members of the balata and chicle group are abundant and well known. Among them are benzol, gasoline, and various products of distillation of petroleum and tar oils.

Among the materials used as varnish softeners and solvents and at the same time as coagulants and precipitants for balata and chicle, and other members of the balata and chicle group, and also as precipitants for waxes may be mentioned the alcohols, aldehyde, ketones, and the esters, either plain or chlorinated, sulphonated or nitrated; also phenols and their homologues.

For a solution containing wool grease and wax or waxy material, the same solvents may be used as for wax, without any wool grease. A large number of such solvents are well known in this art, for instance benzol and its homologues, toluol, xylol, volatile ketones and volatile acetates.

The proportions and practical strengths of the materials may be varied within reasonable limits without changing the general character of the result.

The composition may be prepared by adding together the following ingredients by weight in the proportions stated:

Wool grease _____ 20
Benzol _____ 50
Solution of chicle or balata, 1 pound to a gallon of solvent _____ 50
Methyl acetone _____ 50
Alcohol _____ 25

Still another example is as follows: using the various ingredients in the proportions stated, by weight:

| | |
|---|---|
| Wool grease | 10 |
| Xylol | 25 |
| Benzol | 25 |
| Methyl acetone | 50 |
| Denatured alcohol | 50 |
| Solution of chicle or balata, as above mentioned | 50 |

I do not limit myself to the precise ingredients above stated, nor to the exact manner described for mixing them or otherwise bringing them together, the scope of my invention being commensurate with my claim.

Having thus described my invention what I claim as new and desire to secure by Letters Patent is as follows:

As a paint and varnish remover an emulsion free from water and containing balata or chicle in solution, mixed with wool grease and volatile organic solvents.

Signed at New York city, in the county of New York and State of New York, this 18th day of November, 1922.

LEO SIMON.